March 10, 1953 F. D. DICKAS 2,630,718
VARIABLE-SPEED MECHANISM
Filed July 19, 1949 7 Sheets-Sheet 1
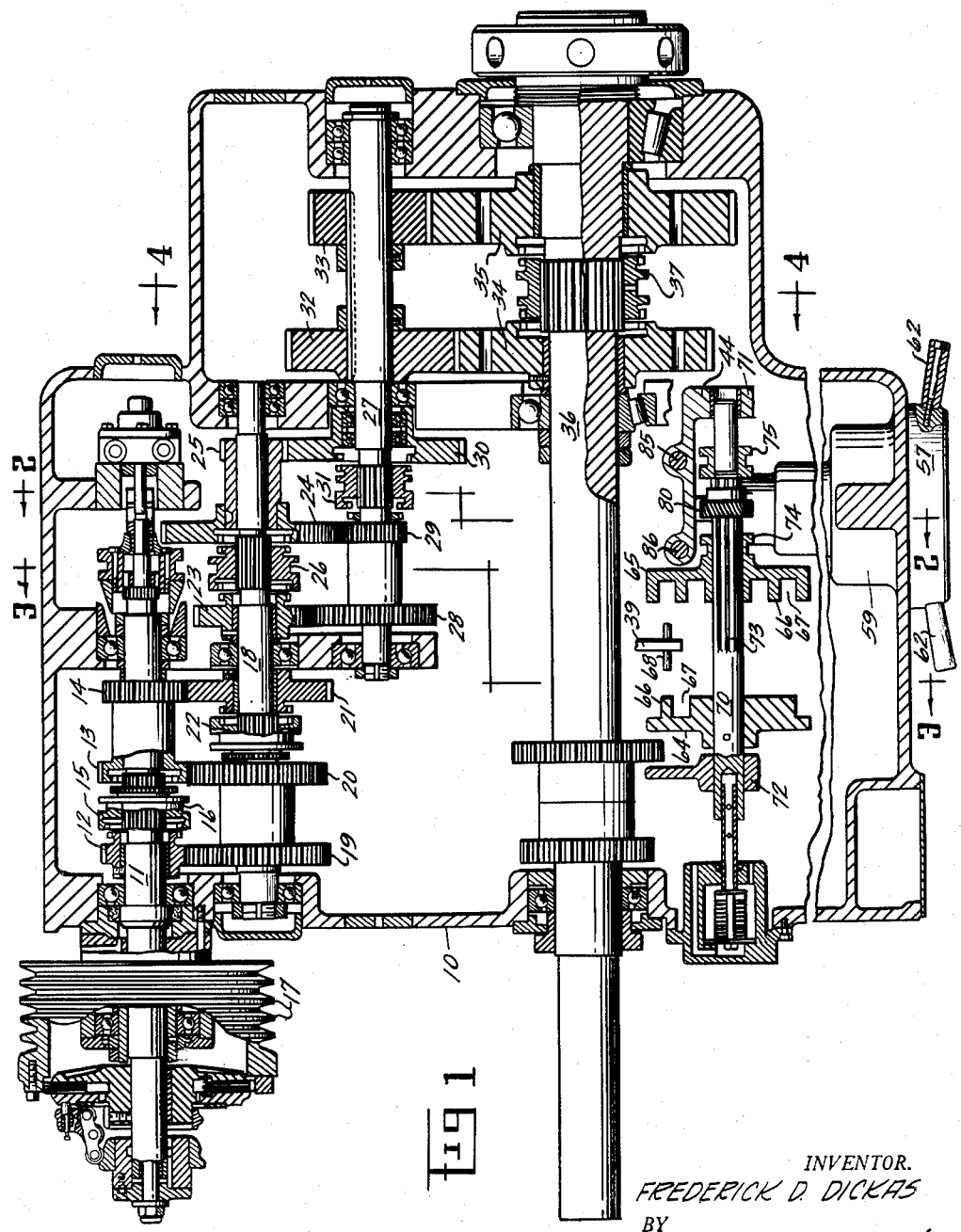
INVENTOR.
FREDERICK D. DICKAS
BY
ATTORNEY

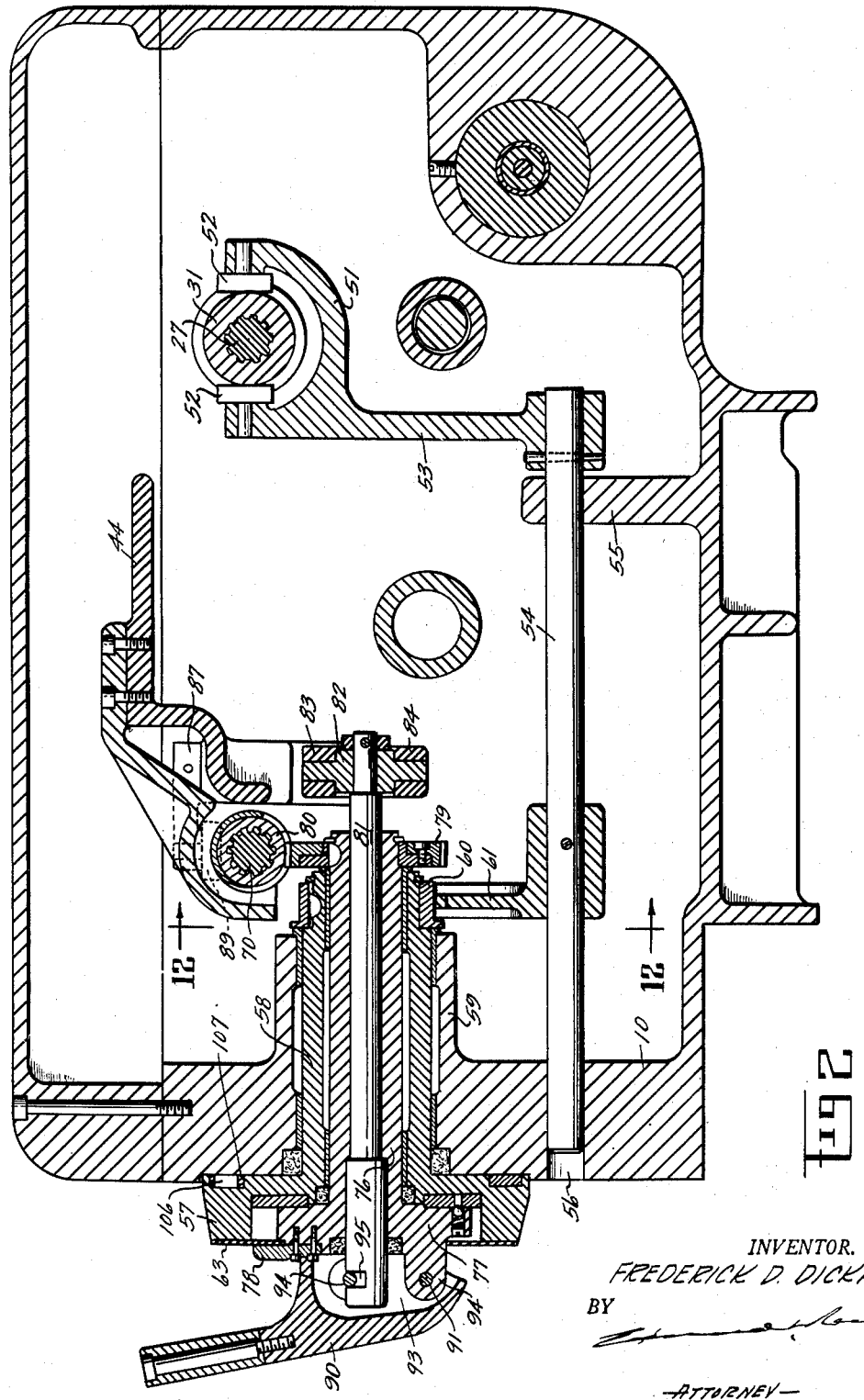

March 10, 1953 F. D. DICKAS 2,630,718
VARIABLE-SPEED MECHANISM
Filed July 19, 1949 7 Sheets-Sheet 3
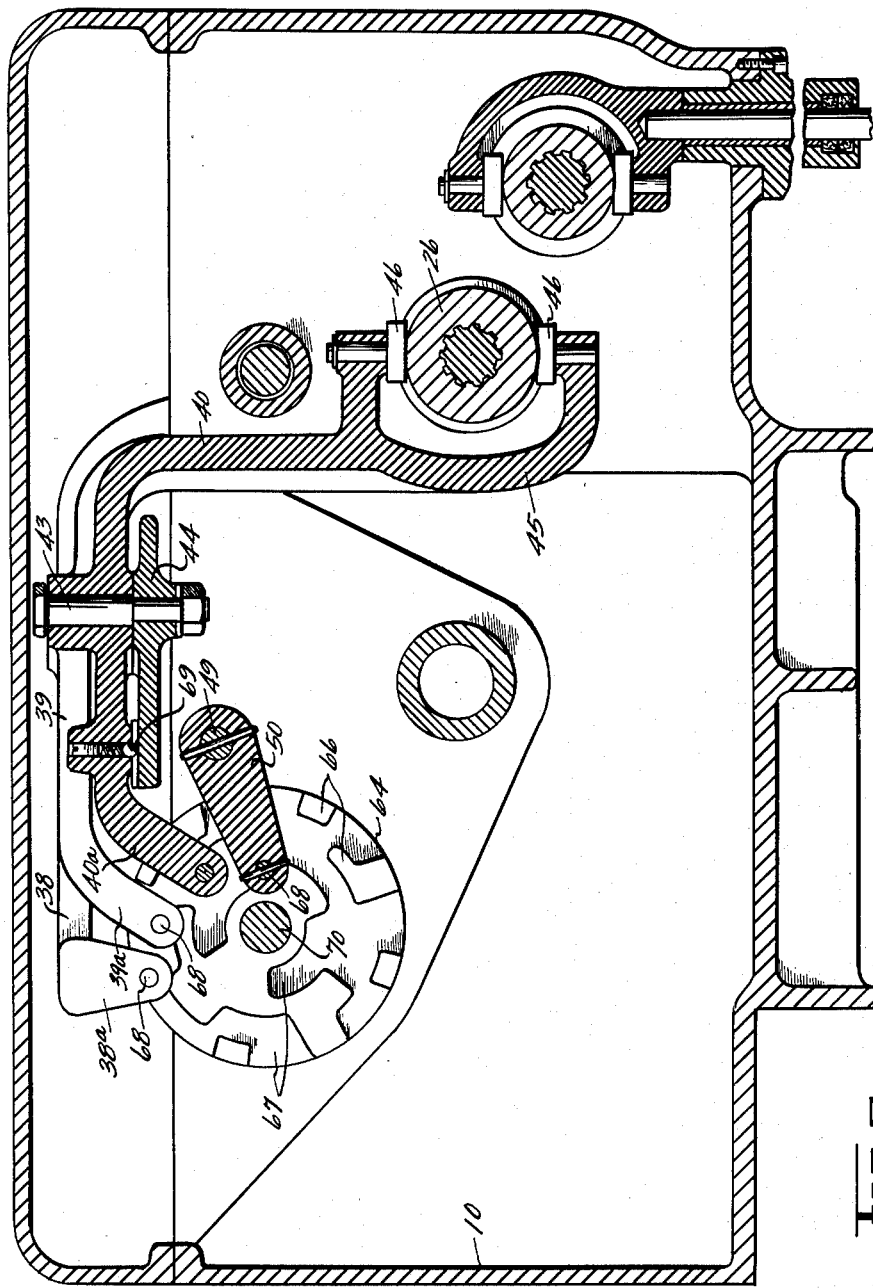
INVENTOR.
FREDERICK D. DICKAS
BY
ATTORNEY—

March 10, 1953 — F. D. DICKAS — 2,630,718
VARIABLE-SPEED MECHANISM
Filed July 19, 1949 — 7 Sheets-Sheet 4
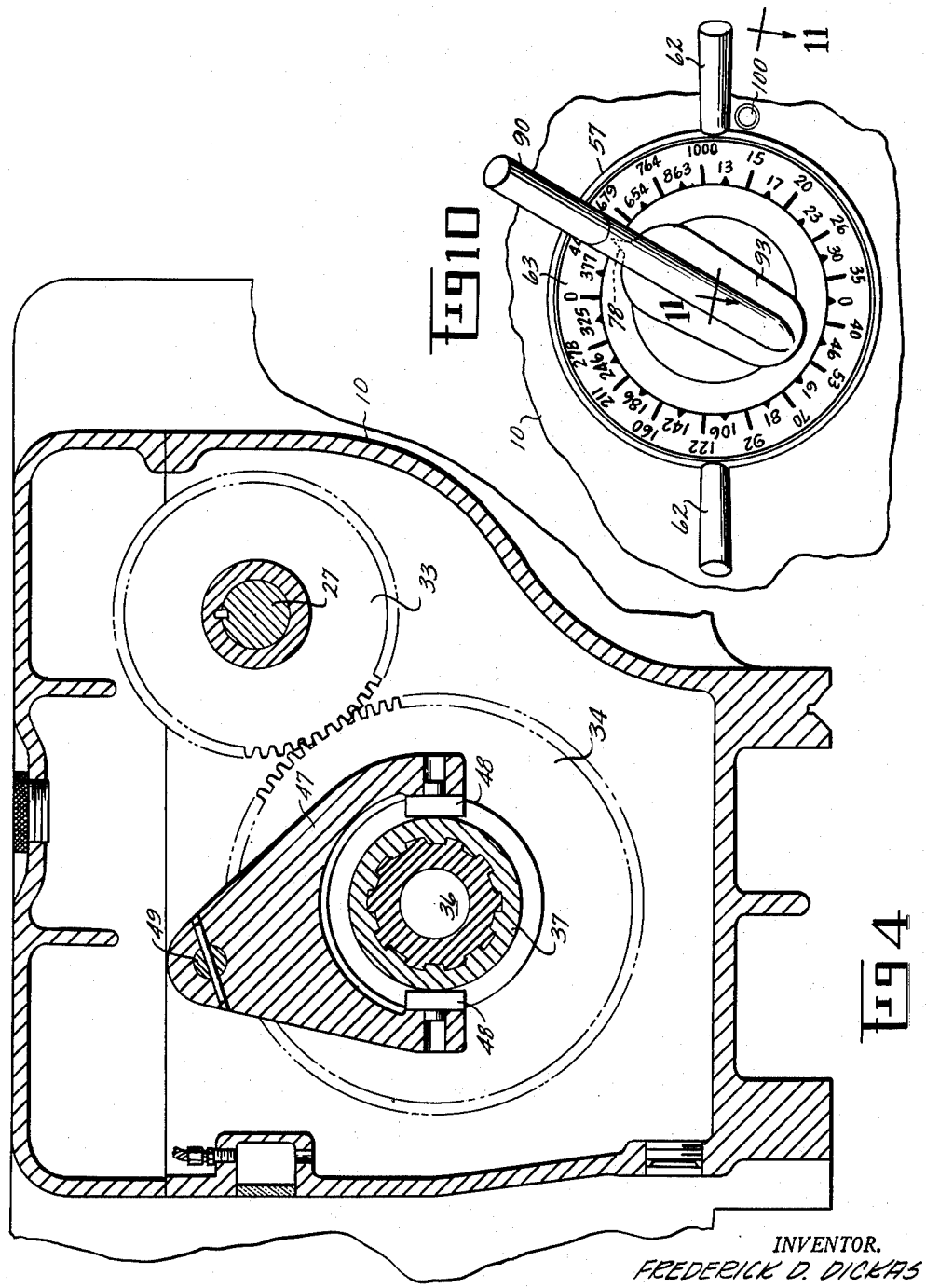
INVENTOR.
FREDERICK D. DICKAS
BY
ATTORNEY

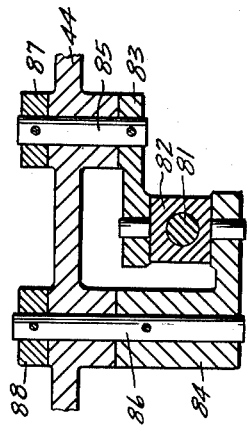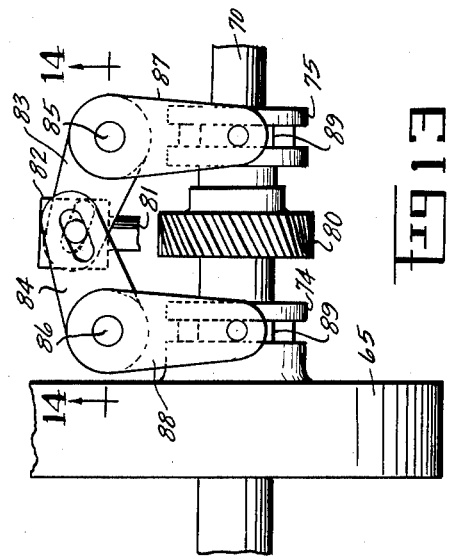

March 10, 1953 F. D. DICKAS 2,630,718
VARIABLE-SPEED MECHANISM
Filed July 19, 1949 7 Sheets-Sheet 6
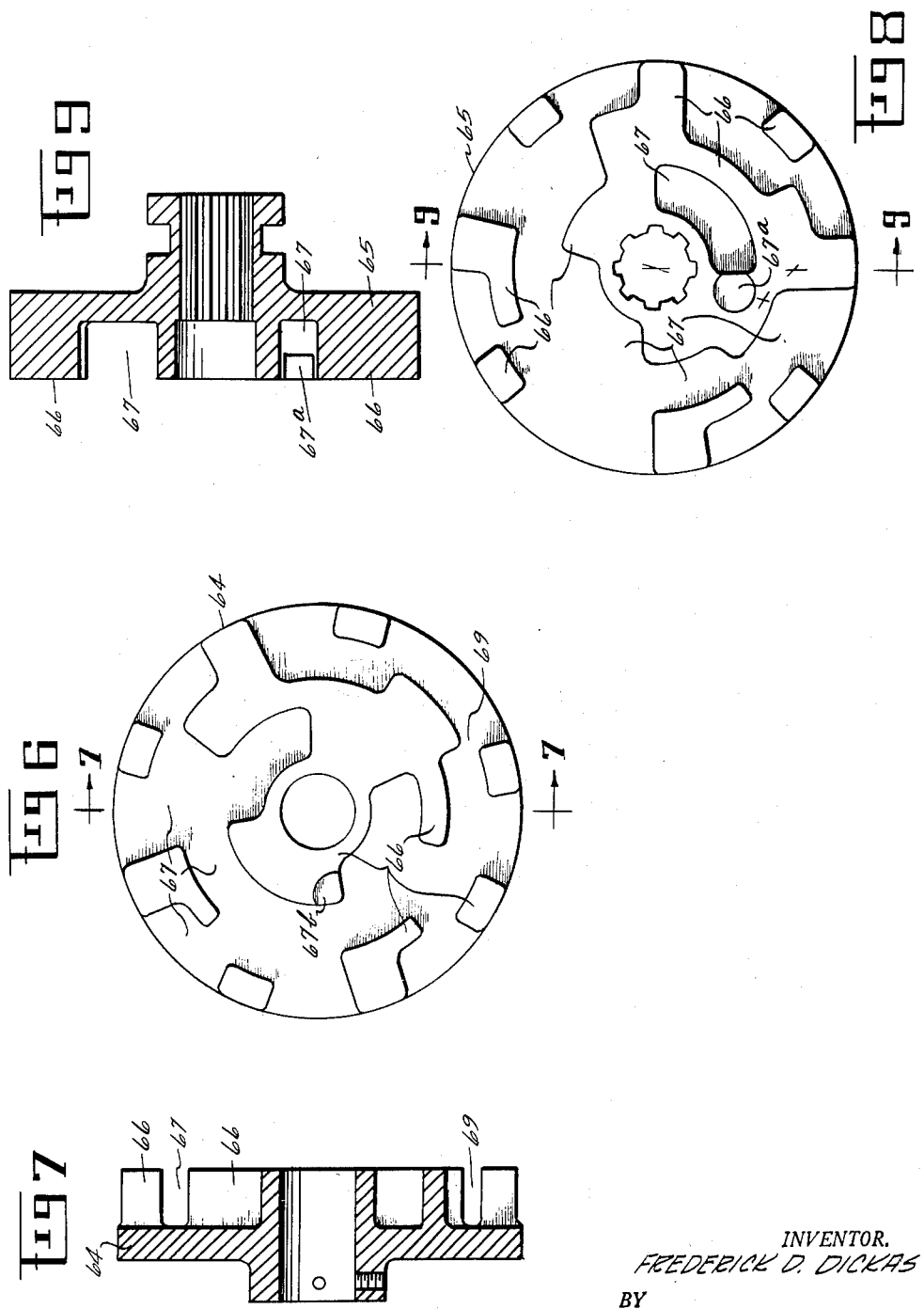
INVENTOR.
FREDERICK D. DICKAS
BY
ATTORNEY March 10, 1953 F. D. DICKAS 2,630,718
VARIABLE-SPEED MECHANISM
Filed July 19, 1949 7 Sheets-Sheet 7

INVENTOR.
FREDERICK D. DICKAS
BY
ATTORNEY—

Patented Mar. 10, 1953

2,630,718

UNITED STATES PATENT OFFICE 2,630,718

VARIABLE-SPEED MECHANISM

Frederick D. Dickas, Sidney, Ohio, assignor to The Sidney Machine Tool Company, Sidney, Ohio, a corporation of Ohio Application July 19, 1949, Serial No. 105,475

16 Claims. (Cl. 74—337.5)

1

This invention relates to a variable speed mechanism and is designed more particularly for use in lathes and other mechanisms where a wide range of speeds is desirable.

The main object of the invention is to provide a variable speed mechanism which may be quickly and accurately adjusted to provide in the output shaft any selected speed within a wide range of speeds.

A further object of the invention is to provide a variable speed mechanism in which a selected speed may be obtained by the manipulation of a minimum number of controlling elements.

A further object of the invention is to provide such a mechanism in which a series of clutches may be selectively shifted by a single movement of each of two controlling members.

A further object of the invention is to provide such a mechanism in which an individually shiftable clutch divides the total range of speeds into a high speed range and a low speed range, and any speed in either the high range or the low range can be obtained by operating a selecting member and an actuating member.

A further object of the invention is to provide such a mechanism in which a series of clutches may be simultaneously shifted by a single actuating device which is adjustable to determine the relation in which the clutches will be connected with their respective gears.

Other objects of the invention may appear as the mechanism is described in detail.

Figure 11:
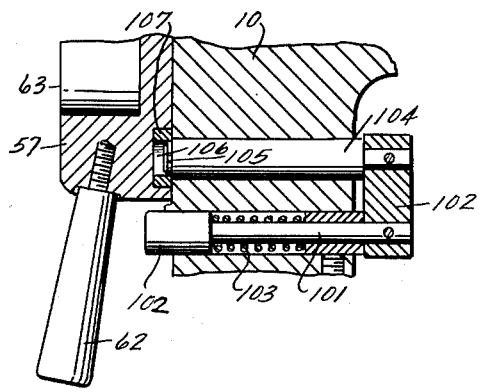
Figure 12:
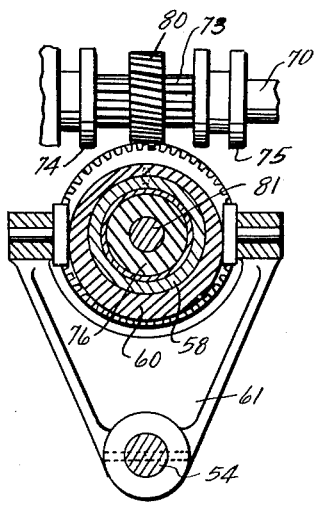

In the accompanying drawings Fig. 1 is a horizontal section through a mechanism embodying the invention, slightly distorted to show the several shafts in a common horizontal plane; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a top plan view of a part of the gear shifting elements; Fig. 6 is a face view of one of the actuating members; Fig. 7 is a section taken on the line 7—7 of Fig. 6; Fig. 8 is a face view of the other of the actuating members; Fig. 9 is a section taken on the line 9—9 of Fig. 8; Fig. 10 is a front elevation of the selecting and operating device; Fig. 11 is a section through a portion of the selecting and operating mechanism taken on line 11—11 on Fig. 10; Fig. 12 is a section taken on the line 12—12 Fig. 2; Fig. 13 is a plan view of the lever mechanism between the operating rod and the actuating members; and Fig. 14 is a section taken on the line 14—14 of Fig. 13.

In these drawings I have illustrated one em-

2 bodiment of the invention and have shown the same applied to a variable speed mechanism of the type in which the gears are rotatably mounted on the respective shafts and are selectively connected with the shafts by clutches, but it is to be understood that the gears may be connected with the shafts in any suitable manner and that the mechanism as a whole, as well as the several parts thereof may take various forms and may be assembled in various ways without departing from the spirit of the invention.

In the embodiment here illustrated the invention comprises a supporting structure 10 which is preferably a housing in which the major parts of the mechanism are enclosed. Mounted in this supporting structure are a plurality of shafts each having thereon a plurality of gears and a clutch or clutches for selectively connecting those gears with the shaft, the gears on each shaft meshing with other gears on an adjacent shaft. In the arrangement shown there are four parallel shafts each mounted in suitable bearings carried by the supporting structure and held against axial movement. The input shaft 11 has rotatably mounted thereon three gears 12, 13 and 14 and the gears 13 and 14 are rigidly connected one with the other. A clutch 15 is mounted on a splined portion of the shaft 11 between the gears 12 and 13 and is provided with the usual peripheral groove 16 to receive a shifting element by which the clutch may be moved into driving engagement with either the gear 12 or the gear 13. The shaft 11 may be rotated by any suitable source of power and as here shown it is provided with a V-belt pulley 17.

The shaft 18 has rotatably mounted thereon gears 19 and 20 which are rigidly connected one with the other and which mesh respectively with the gears 12 and 13 on shaft 11. A third gear 21 rotatably supported on the shaft 18 meshes with the gear 14 on shaft 11. A clutch 22 is slidably mounted on a splined portion of the shaft 18 for engagement with either the gear 20 or the gear 21. Also rotatably mounted on the shaft 18 are three gears 23, 24 and 25, a clutch 26 being slidably mounted on a splined portion of the shaft 18 for driving connection with either of the gears 23 or 24 and the gear 25 being rigidly connected with the gear 24.

Rotatably mounted on the shaft 27 are two rigidly connected gears 28 and 29 which mesh respectively with the gears 23 and 24 on shaft 18, and a gear 30 which meshes with the gear 25 on the shaft 18. A clutch 31 is slidably mounted on a splined portion of the shaft 27 between gears 29 and 30 for driving connection with either of said gears. Rigidly mounted on the shaft 27 are two gears 32 and 33 which mesh respectively with gears 34 and 35 on the fourth shaft 36, which is the output shaft, and a clutch 37 is slidably mounted on a splined portion of the shaft 36 between the gears 34 and 35 to drivingly connect either of said gears with the shaft.

For the purpose of illustration the foregoing gears are shown as ordinary spur gears, but they may be of any suitable type and in practice they are usually herringbone gears.

As shown in the drawings the gears 12, 13, 14, 19, 20 and 21 are arranged in a group and by properly shifting the clutches 16 and 22 these gears can be connected in such sequences that power can be transmitted from the shaft 11 to the shaft 18 at a selected one of four speeds. Likewise the gears 23, 24, 25, 28, 29 and 30 are arranged in a second group and by proper shifting of the clutches 26 and 31 the power may be transmitted from the shaft 18 to the shaft 27 at any one of four speeds. Inasmuch as any one of the four speeds transmitted from the shaft 11 to the shaft 18 may be transmitted from the shaft 18 to the shaft 27 at four different speeds, it is apparent that the power may be transmitted from shaft 11 to shaft 27 at any one of sixteen speeds. A third group of gears includes the gears 32, 33, 34 and 35 and by manipulating the clutch 37 any one of the speeds at which the shaft 27 rotates may be transmitted to the output shaft 36 at either of two speeds. Consequently power may be transmitted from the input shaft 11 to the output shaft 36 at any one of thirty-two speeds. Each of the clutches 16, 22, 26, 31 and 37 is provided with the usual peripheral groove to receive a shifting element.

It will be noted that the clutch 31 is located at the center of the speed range and divides the total range into a high speed range and a low speed range. Separate means are provided for selectively shifting the clutches and preferably the clutch 31, which divides the speed range into two parts, is individually shifted. In the present instance the remaining clutches, 16, 22, 26 and 27, are shifted simultaneously by a single actuating device which is adjustable to determine the direction in which each of these clutches is moved. As shown in Figs. 3 and 5 the clutches 16, 22 and 26 are provided with separate shifting elements, here shown as levers 38, 39 and 40 pivotally mounted between their ends on studs 41, 42 and 43 mounted in a supporting member or plate 44 rigidly mounted within the housing. Each of the levers 38, 39 and 40 is provided with a yoke 45 which embraces the corresponding clutch and is provided with pivoted shoes 46 which extend into the peripheral groove of that clutch, as shown in Fig. 3 in connection with clutch 26. Each of the shifting levers is provided at its other end with a downturned end portion, 38a, 39a and 40a arranged substantially in a common plane. The shifting element for the clutch 37, Fig. 4, comprises a yoke 47 having pivoted shoes 48 which extend into the peripheral groove of the clutch 37. The yoke 47 is rigidly secured to a slidable shaft 49, as by pinning the same thereto, and rigidly secured to this shaft is an arm 50, Fig. 3, the free end of which is arranged in substantially the same plane with the downturned ends of the shifting levers 38, 39 and 40.

The shifting element for the dividing clutch 31 comprises a yoke 51, Fig. 2, provided with pivoted shoes 52 mounted in the groove of the clutch 31, the yoke being carried by an arm 53 rigidly secured to a shaft 54 rotatably mounted in bearings 55 and 56 in the supporting structure. The shaft 54 is controlled by an adjusting element mounted on the front wall of the housing and here shown as an annular member 57 provided with an elongate tubular portion or shaft 58 rotatably mounted in a bearing 59 carried by the front wall of the housing. This annular member is connected with the shaft 54 to impart rocking movement thereto and thus shift the dividing clutch 31 into either a high or a low range position. In the arrangement shown an eccentric collar 60 is rigidly secured to the inner end of the tubular shaft 58 and a yoke 61 rigidly secured to the shaft 54 has its arms arranged on opposite sides of and in contact with the eccentric collar 60. The eccentric collar is so arranged that when the annular member 57 is rotated in one direction to one limit of its movement the clutch 31 will be shifted in one direction and when the annular member is rotated to the other limit of its movement the clutch 31 will be shifted in the opposite direction. It will thus be apparent that the shifting of the dividing clutch 31 is effected independently of the shifting of the other clutches. The annular member 57 of the adjusting device is provided with handles 62 (Fig. 10) by means of which it may be rotated and it carries on its face a dial 63 having thereon thirty-four graduations, two diametrically opposite graduations being numbered zero to indicate the neutral positions of the transmission. The remaining graduations are provided with numbers indicative of the different speeds which may be obtained by the mechanism.

Releasable means are provided by retaining the annular member 57 in the position to which it has been moved. As shown in Fig. 11 this means comprises a locking pin or plunger 104 slidably mounted in a bore in the wall of the housing 10 and having an end portion 105, preferably reducing diameter, adapted to extend into a locking recess 106 in the inner face of the annular member 57, the recess being preferably provided with a hardened bushing 107. A push rod 101 is slidably supported in a second bore in the wall of the housing and is connected at its inner end with the inner end of the plunger 104 by a rigid connecting member 102. The rod 101 has an enlarged outer end portion which projects beyond the wall of the housing 10 and this rod is urged outwardly by a spring 103 supported in the second bore and engaging the enlarged end of the rod. Thus the action of the spring 101 moves the plunger 104 into the recess in the annular member, when the latter is in line therewith, and retains the same in the recess. The end of the push rod, which constitutes a push button, is so supported with relation to the annular member 57 that when that member is in either of its neutral positions the push buttons will be adjacent one or the other of the handles 62, where it may be easily engaged by the hand of the operator and actuated to retract the plunger and release the annular member for rotation.

An adjustable actuating device is provided to actuate the clutch shifting elements 38, 39, 40 and 50 and preferably comprises two members 64 and 65 which are spaced apart to receive between them the end portions of these shifting elements. The two members (Figs. 1 and 6 to 9) are provided with cooperating parts to engage and actuate the several shifting elements and are adjustable to move selected cooperating parts into operative relation with the clutch shifting elements. In the construction shown each of the actuating members 64 and 65 is provided on that face which is opposed to the other member with a plurality of projections 66 and has formed therein a plurality of cavities 67, each projection of each member being in line with a cavity in the other member. The two members are adjustable in their respective planes to locate the several projections and cavities in different positions with relation to the several clutch shifting elements and are then movable transversely to their planes to cause the projections to engage and actuate the respective shifting elements. Preferably each shifting element is provided adjacent the end thereof with a pin 68 (Figs. 3 and 5) rigidly secured thereto and projecting beyond both sides thereof. When the two members of the actuating device are in any of their rotatively adjusted positions each pin 68 will lie between a projection on one of the actuating members and a cavity in the other actuating member and when the actuating members are moved one toward the other the projection will engage the adjacent end of said pin and impart operative movement to the shifting element which carries that pin, the other end of the pin entering the cavity in the other of said actuating members. The ends of the shifting elements are spaced different distances from the edge portions of the actuating members, thus enabling the actuating device to be adjusted to bring selected projections into line with the pins of the respective shifting elements. A part of the pins may be engaged by a projection or projections on one of said actuating members and moved in one direction and another part of said pins may be engaged by a projection or projections on the other of said actuating members and moved in the opposite direction. Preferably means are provided for yieldably retaining the shifting elements in their adjusted positions, such as a spring detent 69.

The actuating device may be supported and selectively operated in any suitable manner. As best shown in Fig. 1 a shaft 70 is mounted for both rotary movement and sliding movement in bearings 71 and 72 carried by the supporting structure. The member 64 is rigidly secured to the shaft 70 for both rotary movement and axial movement therewith. The member 65 is slidably mounted on a splined portion 73 of the shaft so that it will rotate therewith and will be movable axially thereof. The actuating member 65 is provided with a grooved hub 74 and a grooved collar 75 is rigidly connected with the shaft to enable the actuating members to be moved axially one toward the other as will be hereinafter described. The shaft 70 is rotated by a selecting member 76 (Fig. 2) which is preferably tubular in form and extends through and is rotatable in the tubular member or shaft 58 and will be herein referred to as the selector sleeve. Rigidly secured to and preferably formed intergral with the outer end of the sleeve is a head 77 which lies within the annular member 57 and is provided with a pointer 78 to move over the dial 63 to designate thereon the output speed which will be obtained when the selecting element is in any selected rotative position. The inner end of the sleeve 76 extends beyond the end of the tubular shaft 58 and has rigidly secured thereto a spiral gear 79 which meshes with a spiral gear 80 on the shaft 70 of the actuating device. Thus the rotation of the selecting member 76 will rotate the actuating members in unison to a position with relation to the shifting elements determined by the position of the pointer 78 on the dial.

Operative movement is imparted to the actuating device by moving the two actuating members one toward the other and in the present instance both members are moved axially. This axial movement of the actuating members is effected by an operating member 81 here shown as a rod which extends through and beyond the ends of the selector sleeve 76 and is longitudinally movable therein. Rigidly secured to the inner end of the operating member is a cross head 82 (Figs. 13 and 14) the ends of which are arranged to engage levers 83 and 84 rigidly secured respectively to the lower ends of two upright shafts 85 and 86 rotatably mounted in the plate 44. Rigidly secured to the upper ends of the respective shafts are two arms 87 and 88 which carry pivoted shoes 89 which extend into the grooved hub 74 and the grooved collar 75, respectively. When the operating rod 81 is moved outwardly the cross head rotates the shafts 85 and 86 in opposite directions thus moving the arms 87 and 88 in opposite directions and causing the shaft 70 and actuating member 64 to move in one direction and the actuating member 65 to move in the opposite direction, these directions being such that the actuating members are moved toward each other when the operating rod is moved outwardly and away from each other when that rod is moved inwardly.

Preferably two of the projections, one on each plate, are approximately one-half the height of the other projections and are arranged in line one with the other, as shown at 67a and 67b in Figs. 8 and 6. These short projections are so positioned that when the selecting member 76 is in a zero position they will be in line with the pin 68 in the arm 50 (Fig. 3) of the shifting element for the clutch 37 and when the actuating plates are moved one toward the other, one or the other of these short projections will engage the pin 68 and move the same to an intermediate position so as to shift the clutch 37 to a neutral position and thus prevent the transmission of power to the output shaft 36.

The selecting and operating devices may be operated in any suitable manner but preferably a single device is provided for that purpose. As shown in Fig. 2 a handle 90 is mounted on a pivot pin 91 in a lug 92 carried by the head 77 of the selector sleeve. This pivotal connection is such that the lateral movement of the handle, that is about the axis of the selector sleeve on which it is mounted, will rotate the selector sleeve in one direction or the other depending, of course, upon the direction in which the handle is moved. This handle is preferably provided with a cup shaped portion 93 which extends about the lug 92 and the outer end of the operating rod 81, and a cross pin 94 mounted in the side walls of the cup extends through a slot 95 in the projecting end of the operating rod so that the movement of the handle about its pivotal axis 91 will impart longitudinal movement to the operating rod.

It will be apparent, therefore, that to select any one of the thirty-two speeds of which the mechanism is capable a maximum of three movements is required. If the dividing clutch 31 is not already set for the speed range within which the desired speed is located, the annular element 57 and its dial 63 are rotated through an arc of 180 degrees. The handle 90 is then rotated about the axis of the selecting element to position the pointer on the latter at the graduation on the dial which corresponds to the desired speed, and the handle is then moved outwardly to impart outward movement to the operating rod and thus impart operative movement to the actuating device. Obviously these movements can be very quickly and easily effected with absolute accuracy because it is only necessary that the pointer on the selecting element shall be correctly positioned with relation to the dial.

While I have shown and described one embodiment of my invention I wish it to be understood that I do not desire to be limited to the details thereof as various modifications may occur to a person skilled in the art.

I claim:

1. In a variable speed mechanism comprising a plurality of shafts, gears movably mounted on the respective shafts, and means including shifting elements for drivingly connecting selected gears in different sequences; an actuating device for selectively operating a plurality of said shifting elements, including two opposed members each having on that side thereof which faces the other member a plurality of projections and a plurality of cavities arranged in predetermined relative positions, each projection on each member being in line with a cavity in the other member, said members being spaced apart to receive between them portions of said shifting elements, said members being rotatable about a common axis to adjust the same with relation to said shifting elements and being movable axially one toward the other to actuate said shifting elements, a selecting device for rotating said members, a device for imparting axial movement to said members, and a single operating member connected with both of said devices and movable in one direction to actuate said selected devices and movable in another direction to impart axial movement to said members.

2. In a variable speed mechanism comprising a plurality of shafts, gears movably mounted on the respective shafts, and means including shifting elements for drivingly connecting selected gears in different sequences; an actuating device for selectively operating a plurality of said shifting elements, including two opposed members each having on that side thereof which faces the other member a plurality of projections and a plurality of cavities arranged in predetermined relative positions, each projection on each member being in line with a cavity in the other member, said members being spaced apart to receive between them portions of said shifting elements, said members being rotatable about a common axis to adjust the same with relation to said shifting elements and being movable axially one toward the other to actuate said shifting elements, and a selecting and operating device for said members including a rotatable tubular selecting member, means actuated by said selecting member for rotating the first mentioned members, an operating member slidable in said tubular member, and means actuated by said operating member for imparting relative axial movements to said first mentioned members.

3. In a variable speed mechanism comprising a plurality of shafts, gears movably mounted on the respective shafts, and means including shifting elements for drivingly connecting selected gears in different sequences; an actuating device for selectively operating a plurality of said shifting elements, including two opposed members each having on that side thereof which faces the other member a plurality of projections and a plurality of cavities arranged in predetermined relative positions, each projection on each member being in line with a cavity in the other member, said members being spaced apart to receive between them portions of said shifting elements, said members being rotatable about a common axis to adjust the same with relation to said shifting elements and being movable axially one toward the other to actuate said shifting elements, and a selecting and operating device for said members including a rotatable tubular selecting member, means actuated by said selecting member for rotating the first mentioned members, an operating member slidable in said tubular member, means actuated by said operating member for imparting relative axial movements to said first mentioned members, and a single handle connected with both said selecting member and said operating member for successively actuating the same.

4. In a variable speed mechanism, a plurality of shafts, a plurality of gears rotatably mounted on each shaft, each gear on each shaft meshing with a gear on an adjacent shaft, clutches on said shafts for selectively connecting said gears with the respective shafts, shifting elements for the respective clutches, one of said clutches being arranged to divide the total speed range into a high speed range and a low speed range, means for individually actuating the shifting element for said dividing clutch, an actuating device for imparting operative movement to the shifting elements for the remainder of said clutches, said actuating device being adjustable with relation to said last mentioned shifting elements to select the gears required to provide a given speed in the final shaft of said mechanism, speed selecting means for adjusting said actuating device, and means for operating said device to actuate said shifting elements in a manner determined by the adjustment thereof.

5. In a variable speed mechanism, a plurality of shafts, a plurality of gears rotatably mounted on each shaft, each gear on each shaft meshing with a gear on an adjacent shaft, clutches on said shafts for selectively connecting said gears with the respective shafts, shifting elements for the respective clutches, one of said clutches being arranged to divide the total speed range into a high speed range and a low speed range, an actuating member mounted on a fixed support for movement to either of two positions and having thereon a series of speed indicating graduations, means controlled by said movement of said actuating member to move the shifting element for said dividing clutch to a position determined by the position to which said actuating member is moved, an actuating device including two members spaced apart to receive between them portions of the shifting elements for the remainder of said clutches, said spaced members having cooperating parts to actuate said shifting elements and being rotatable to selected positions with relation to said portions of said shifting elements, said spaced actuating members being axially movable to actuate said shifting elements, a selecting member movably mounted on said fixed support and having an indicating element movable along the graduations on said actuating member, means controlled by said selecting member for rotating said spaced actuating members to selected positions, a third member movably mounted on said fixed support, and means operated by said third member for imparting axial movements to said spaced actuating members.

6. In a variable speed mechanism, a plurality of shafts, a plurality of gears rotatably mounted on each shaft, each gear on each shaft meshing with a gear on an adjacent shaft, clutches on said shafts for selectively connecting said gears with the respective shafts, shifting elements for the respective clutches, one of said clutches being arranged to divide the total speed range into a high speed range and a low speed range, an actuating device including two opposed members spaced one from the other to receive between them portions of each of a plurality of said clutch shifting elements and having co-operating parts to engage and actuate said shifting elements, means for supporting said members for rotation to selected positions with relation to said plurality of shifting elements and for axial movement to actuate the latter, a selecting and operating unit mounted on a fixed support and comprising an annular member rotatable to either of two positions and having thereon a series of speed indicating graduations, means operable by said annular member for actuating the shifting element for said dividing clutch, a rotatable tubular selecting member extending through said annular member and having a pointer movable along said series of graduations, means operable by the rotation of said selecting member to rotate said spaced actuating members, an elongate member slidably supported in said tubular selecting member, and means operable by said elongate member to impart axial movement to said spaced actuating members.

7. In a variable speed mechanism, a plurality of shafts, a plurality of gears rotatably mounted on each shaft, each gear on each shaft meshing with a gear on an adjacent shaft, clutches on said shafts for selectively connecting said gears with the respective shafts, shifting elements for the respective clutches, a shaft extending transversely to a plurality of said shifting elements, opposed actuating members mounted on said shaft, spaced one from the other to receive between them portions of said plurality of shifting elements and having cooperating parts to engage and actuate said shifting elements, said members being connected with said shaft for rotation therewith and for relative axial movement, a tubular selecting member rotatably mounted in a fixed support, gearing connecting said selecting member with said transverse shaft to rotate said actuating members to selected positions with relation to said shifting elements, an elongate member extending through and slidable in said selecting member, means connected with said elongate member and actuated by the sliding movement thereof to impart relative axial movement to said opposed actuating members to actuate said shifting elements, and a handle mounted on said selecting element to rotate the same and connected with said elongate member to impart longitudinal movement thereto.

8. In a variable speed mechanism, a plurality of shafts, gears mounted on the respective shafts, clutches for connecting selected gears in different sequences, shifting elements for actuating the respective clutches, one of said clutches being arranged to divide the total speed range into a high speed range and a low speed range, means for actuating the shifting elements for the remainder of said clutches including members spaced one from the other to receive between them portions of said shifting elements and supported for rotary movement about a common axis and for relative axial movement, each of said members having element engaging parts facing the other of said members and out of alinement with the element engaging parts of said other member, selecting mechanism including a member connected with the shifting element for said dividing clutch to move said clutch to high speed position or to low speed position, a member to rotate said actuating members to selected positions with relation to said shifting elements and a member to impart relative axial movement to said actuating members, and means for operating said selecting members.

9. In a variable speed mechanism, a plurality of shafts, gears mounted on the respective shafts, clutches for connecting selected gears in different sequences, one of said clutches being arranged to divide the total speed range into a high speed range and a low speed range, means for actuating the shifting elements for the remainder of said clutches including members spaced one from the other to receive between them portions of said shifting elements and supported for rotary movement about a common axis and for relative axial movement, each of said members having element engaging parts facing the other of said members and out of alinement with the element engaging parts of said other member, selecting mechanism including a member connected with the shifting element for said dividing clutch to move said clutch to high speed position or to low speed position, a member to rotate said actuating members to selected positions with relation to said shifting elements and a member to impart relative axial movement to said actuating members, and a single operating member connected with said selecting members to successively operate the same.

10. In a variable speed mechanism, a plurality of shafts, gears mounted on the respective shafts, clutches for connecting selected gears in different sequences, shifting elements for actuating the respective clutches, one of said clutches being arranged to divide the total speed range into a high speed range and a low speed range, means for actuating the shifting elements for the remainder of said clutches including members spaced one from the other to receive between them portions of said shifting elements and supported for rotary movement about a common axis and for relative axial movement, each of said members having element engaging parts facing the other of said members and out of alinement with the element engaging parts of said other member, selecting mechanism including a rotatable tubular member connected with the shifting element for said dividing clutch to move the latter to high speed position or to low speed position, a tubular member rotatable in the first mentioned tubular member and connected with said actuating members to rotate the same to selected positions with relation to said shifting elements, a member slidably supported in the last mentioned tubular member, and means connected with said slidable member for imparting relative axial movements to said actuating members, and means for successively actuating said selecting members.

11. In a variable speed mechanism, a plurality of shafts, gears mounted on the respective shafts, clutches for connecting selected gears in different sequences, shifting elements for actuating the respective clutches, one of said clutches being arranged to divide the total speed range into a high speed range and a low speed range, means for actuating the shifting elements for the remainder of said clutches including members spaced one from the other to receive between them portions of said shifting elements and supported for rotary movement about a common axis and for relative axial movement, each of said members having element engaging parts facing the other of said members and out of alinement with the element engaging parts of said other member, selecting mechanism including a rotatable tubular member connected with the shifting element for said dividing clutch to move the latter to high speed position or to low speed position, a tubular member rotatable in the first mentioned tubular member and connected with said actuating members to rotate the same to selected positions with relation to said shifting elements, a member slidably supported in the last mentioned tubular member and means connected with said slidable member for imparting relative axial movements to said actuating members, and a single operating device connected with each of said selecting members to actuate the same.

12. In a variable speed mechanism comprising a plurality of shafts, gears movably mounted on the respective shafts, means including shifting elements for drivingly connecting different gears in different sequences; selective means for actuating a plurality of shifting elements including a shaft supported for both rotary and axial movement, a member rigidly secured to said shaft, a second member supported on said shaft for rotation therewith and for axial movement with relation thereto, said members being spaced apart to receive between them portions of said shifting elements and each member having a plurality of element engaging parts facing the other member and out of alinement with the element engaging parts of said other member, means for rotating said shaft to move said member to selected positions with relation to said shifting elements, and means for simultaneously imparting axial movement to said shaft and to said second member in opposite directions to move said members into or out of operative engagement with said shifting elements.

13. In a variable speed mechanism comprising a plurality of shafts, gears movably mounted on the respective shafts, means including shifting elements for drivingly connecting different gears in different sequences; selective means for actuating a plurality of shifting elements including a shaft supported for both rotary and axial movement, a member rigidly secured to said shaft, a second member supported on said shaft for rotation therewith and for axial movement with relation thereto, said members being spaced apart to receive between them portions of said shifting elements and each member having a plurality of element engaging parts facing the other member and out of alinement with the element engaging parts of said other member, a gear splined to said shaft, means for actuating said gear to rotate said members to selected positions with relation to said shifting elements, means for imparting relative axial movements to said members including devices movable about laterally spaced fixed axes, means for operatively connecting said devices with said shaft and said second member, respectively, and means for moving said devices in opposite directions about their respective axes.

14. In a variable speed mechanism comprising a plurality of shafts, gears movably mounted on the respective shafts, means including shifting elements for drivingly connecting different gears in different sequences; selective means for actuating a plurality of shifting elements including a shaft supported for both rotary and axial movement, a member rigidly secured to said shaft, a second member supported on said shaft for rotation therewith and for axial movement with relation thereto, said members being spaced apart to receive between them portions of said shifting elements and each member having a plurality of element engaging parts facing the other member and out of alinement with the element engaging parts of said other member, a gear splined to said shaft, means for actuating said gear to rotate said members to selected positions with relation to said shifting elements, means for imparting relative axial movements to said members including crank arms mounted for movement about laterally spaced axes and extending one toward the other, means operatively connecting said crank arms respectively with said shaft and said second member, a cross head operatively connected with said crank arms, and means for moving said cross head transversely to the axes of said crank arms.

15. In a variable speed mechanism comprising a plurality of shafts, gears movably mounted on the respective shafts, means including shifting elements for drivingly connecting different gears in different sequences; selective means for actuating a plurality of shifting elements including a shaft supported for both rotary and axial movement, a member rigidly secured to said shaft, a second member supported on said shaft for rotation therewith and for axial movement with relation thereto, said members being spaced apart to receive between them portions of said shifting elements and each member having a plurality of element engaging parts facing the other member and out of alinement with the element engaging parts of said other member, a gear splined to said shaft, means for actuating said gear to rotate said members to selected positions with relation to said shifting elements, said means including a rotatable tubular member, and means for imparting relative axial movements to said opposed members including devices connected respectively with said shaft and said second member, and an elongate member slidably supported in said tubular member and operatively connected with said devices.

16. In a variable speed mechanism comprising a plurality of shafts, gears movably mounted on the respective shafts, means including shifting elements for drivingly connecting different gears in different sequences; selective means for actuating a plurality of shifting elements including a shaft supported for both rotary and axial movement, a member rigidly secured to said shaft, a second member supported on said shaft for rotation therewith and for axial movement with relation thereto, said members being spaced apart to receive between them portions of said shifting elements and each member having a plurality of element engaging parts facing the other member and out of alinement with the element engaging parts of said other member, a gear splined to said shaft, means for actuating said gear to rotate said members to selected positions with relation to said shifting elements, said means including a rotatable tubular member, means for imparting relative axial movements to said opposed members including devices connected respectively with said shaft and said second member, an elongate member slidably supported in said tubular member and operatively connected with said devices, and an operating member connected with said tubular member and said elongate member and movable in one direction to rotate said tubular member and in another direction to impart longitudinal movement to said elongate member.

FREDERICK D. DICKAS.

REFERENCES CITED

The following references are of record in the file of this patent:

UNITED STATES PATENTS

| Number | Name | Date |
|---|---|---|
| 1,858,491 | Gallimore | May 17, 1932 |
| 1,975,060 | Flanders | Sept. 25, 1934 |
| 1,991,349 | Gallimore | Feb. 12, 1935 |
| 2,056,792 | Lovely | Oct. 6, 1936 |
| 2,106,731 | Gallimore | Feb. 1, 1938 |
| 2,331,704 | Lange | Oct. 12, 1943 |
| 2,365,571 | Lloyd | Dec. 19, 1944 |
| 2,434,051 | Randol | Jan. 6, 1948 |
| 2,466,814 | Le Blond | Apr. 12, 1949 |

FOREIGN PATENTS

| Number | Country | Date |
|---|---|---|
| 526,523 | Great Britain | Sept. 19, 1940 |
| 813,617 | France | June 5, 1937 |